United States Patent [19]

Erlund

[11] 3,864,533

[45] Feb. 4, 1975

[54] AUTOMATIC LINE TRANSFER SYSTEM AND METHOD FOR A COMMUNICATIONS SYSTEM

[75] Inventor: Anthony H. Erlund, Sunnyvale, Calif.

[73] Assignee: Vidar Corporation, Mountain View, Calif.

[22] Filed: June 1, 1973

[21] Appl. No.: 365,846

[52] U.S. Cl. .................... 179/175.3 R, 340/147 SC

[51] Int. Cl. .................................... H04b 3/46

[58] Field of Search ........... 179/175.2 R, 175.3 R, 179/175.31 R; 340/147 SC

[56] References Cited

UNITED STATES PATENTS

| | | | |
|---|---|---|---|
| 2,680,162 | 6/1954 | Brehm et al. | 179/175.3 R |
| 3,364,467 | 1/1968 | Haibt et al. | 179/175.3 R |
| 3,364,468 | 1/1968 | Haibt et al. | 179/175.3 R |
| 3,715,503 | 2/1973 | Jungbluth et al. | 179/175.3 R |
| 3,718,781 | 2/1973 | Angner et al. | 179/175.3 R |
| 3,742,154 | 6/1973 | Bidlack et al. | 179/175.3 R |

*Primary Examiner*—William C. Cooper
*Assistant Examiner*—Douglas W. Olms
*Attorney, Agent, or Firm*—Flehr, Hohbach, Test, Albritton & Herbert

[57] ABSTRACT

In a communications system such as a telephone system, an automatic line transfer system for a failed line includes a method and apparatus for looping around the failed line by a protection line and locating a remote failure by cross connecting the failed line to the preceding protection line and thereafter interrogating from the command office. The equipment determines whether a failed line is good again and will accept a remote manual reset.

14 Claims, 7 Drawing Figures

NOTES:

6415

6426

6425

— TRANSFER PATH

--- INTERROGATION PATH

AUTOMATIC LINE TRANSFER SYSTEM AND METHOD FOR A COMMUNICATIONS SYSTEM

BACKGROUND OF THE INVENTION

The present invention is directed in general to an automatic line transfer system and method for a communications system and more specifically to a system and method for locating a remote failure.

In one prior art system where a protection line was utilized upon failure of a working line the protection line in that span was simply picked up and used to loop around the failure. Moreover, when a remote span failed, a repair crew would have to travel out to all of the remote offices and examine each link separately to find which section or span had failed Another prior art technique is simply to patch around the failure region with telephone cords in the adjacent offices. This had the disadvantage that if the failed line was utilized in a pulse code modulation (PCM) system which normally includes 24 trunks, a system failure would immediately busy out all 24 trunks. If they were actually in use when the failure occurred, all connections would be dropped back to the switching equipment and any toll revenue being collected by calls carried by this equipment would be lost. Also the subscriber must again set up his call.

OBJECTS AND SUMMARY OF THE INVENTION

It is, therefore, a primary object of the present invention to provide an improved automatic line transfer system in a communications system.

It is another object of the invention to provide an automatic line transfer system as above in which the failed line span can be located even if between remote offices and in particular identify the failed repeater.

It is yet another object of the invention to provide a transfer system as above where the failed line, upon becoming good again, can be locally, remotely or automatically reset.

In accordance with the above objects there is provided in a communications system an automatic line transfer system for automatically switching both ends of a failed span of one of a plurality of working lines to a protection line without service interruption. The working lines include a plurality of spans beginning and terminating at offices remote from a command office. In the transfer system means sense a failed span of the working line. Means responsive to such sensing both ends of the failed line to a corresponding span of the protection line whereby the failed line is looped around. The failed line is cross-connected to the preceding span of the protection line to connect the failed line to the command office.

In addition, a corresponding method is provided.

DETAILED DESCRIPTION OF THE PREFERRED EMBODIMENT

Figure 1A:
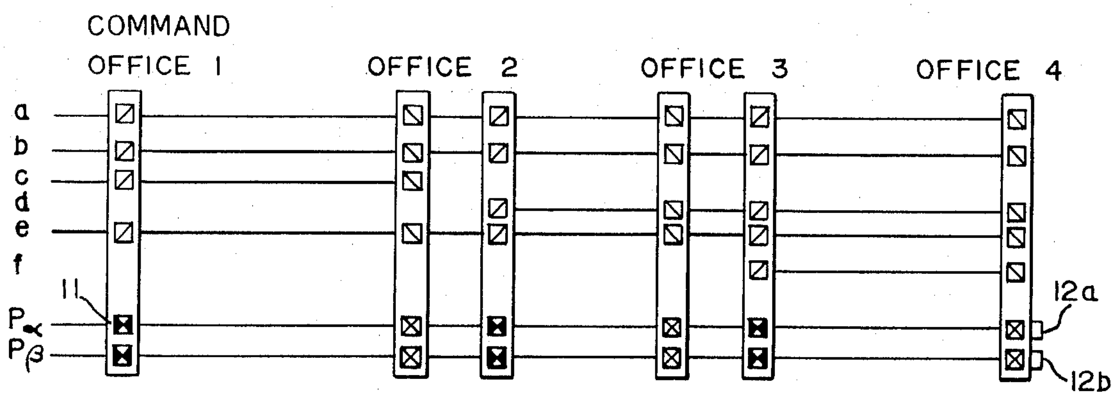
FIGS. 1A and 1B are simplified block diagrams depicting the basic application of the system of the present invention.
Figure 1B:
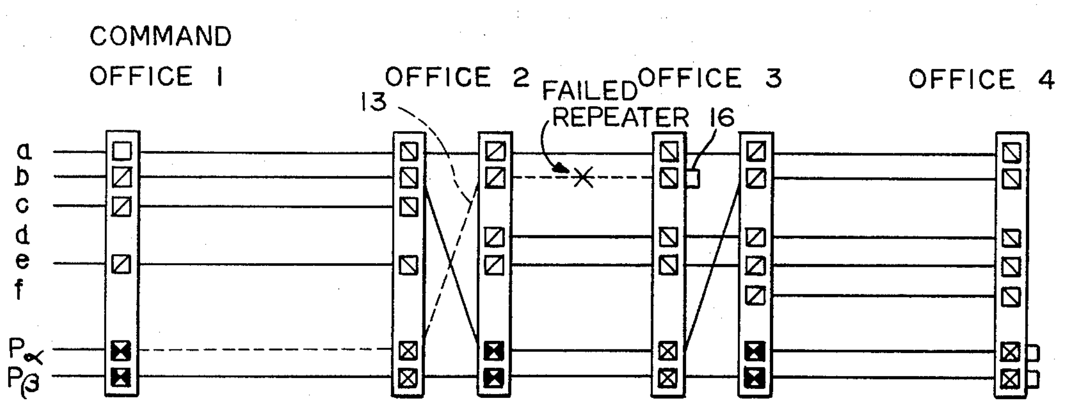

FIGS. 1A and 1B are simplified block diagrams depicting the basic application of the present invention. As indicated by the "Notes" portion of the drawings, a slash in the block indicates a 6415 unit corresponding to FIG. 2; a cross in a block a 6425 unit corresponding to FIG. 3; and the remaining half solid type cross a 6426 type unit illustrated in greater detail in FIG. 4. The solid lines are transfer paths; the dashed lines are interrogation paths as will be explained in detail below.

The system example illustrated consists of four offices, one through four, with some through lines (*a*, *b*, *e*), a terminated line (*c*), and some originating lines (*d* and *f*). Two lines designated as the protection lines, P$\alpha$ and P$\beta$ also run between offices one and four. The command office is office one and the remote offices are offices two and three which would normally be unmanned. The term "office" is used here for simplicity but includes any span junction point.

In the normal situation as illustrated in FIG. 1A where no failure has occurred, both line *b* and the protection lines P$\alpha$ and P$\beta$ would be linked to offices one to four. As will be explained in greater detail below a keep alive code of one pulse in six time slots (1:6) injected down each of the protection lines by the command 6425 units illustrated at 11 travels to the remote office four and is looped back by the loops 12*a* and 12*b*. Any suitable 1 choice of code formats can of course be made. It is then detected at office one and is interpreted as no failures and no transfers. More specifically system fault lights at office one are not illuminated.

Referring now to FIG. 1B, if a repeater fails in line *b* between office two and office three, office three in accordance with the invention signals office two and a preceding span of the incoming protection line, P$\alpha$, is cross-connected to the failed line *b* as shown by the dashed cross connection 13 to thereby connect the failed line to the command office. The failure which has occurred may be indicated by a high rate of bipolar violations, no pulses, the amplitude being out of tolerance, or an oscillating line. Any one of these conditions would be detected by the fault dectector in the 6415 unit of office three. The decision to transfer made by the 6415 unit in office three is communicated to the 6415 unit in office two, by a "wink" code to be discussed below, whereupon the corresponding ends of the lines will be transferred down to the protection line illustrated; thus the failed repeater is looped around. Service on line *b* now travels around the failed line via the protection line and back onto line b between office three and office four.

In addition, on the failed line span between office two and office three, a loop 16 is provided at the far end. Thus, any pulse code modulation that is now launched from the command office on the protection line will travel to the failed portion by cross connection 13, be looped around at 16 and thereafter be received by the command office for analysis. As is well known in the PCM art, by use of proper interrogation codes generated by, for example, a span and repeater test set which is commercially available in the market, the failed repeater section and its location can be detected. The fact that the failed repeater section remains in failure is continuously indicated by a system fault indication or light which is received by the 6425 unit in command office one.

Figure 2:
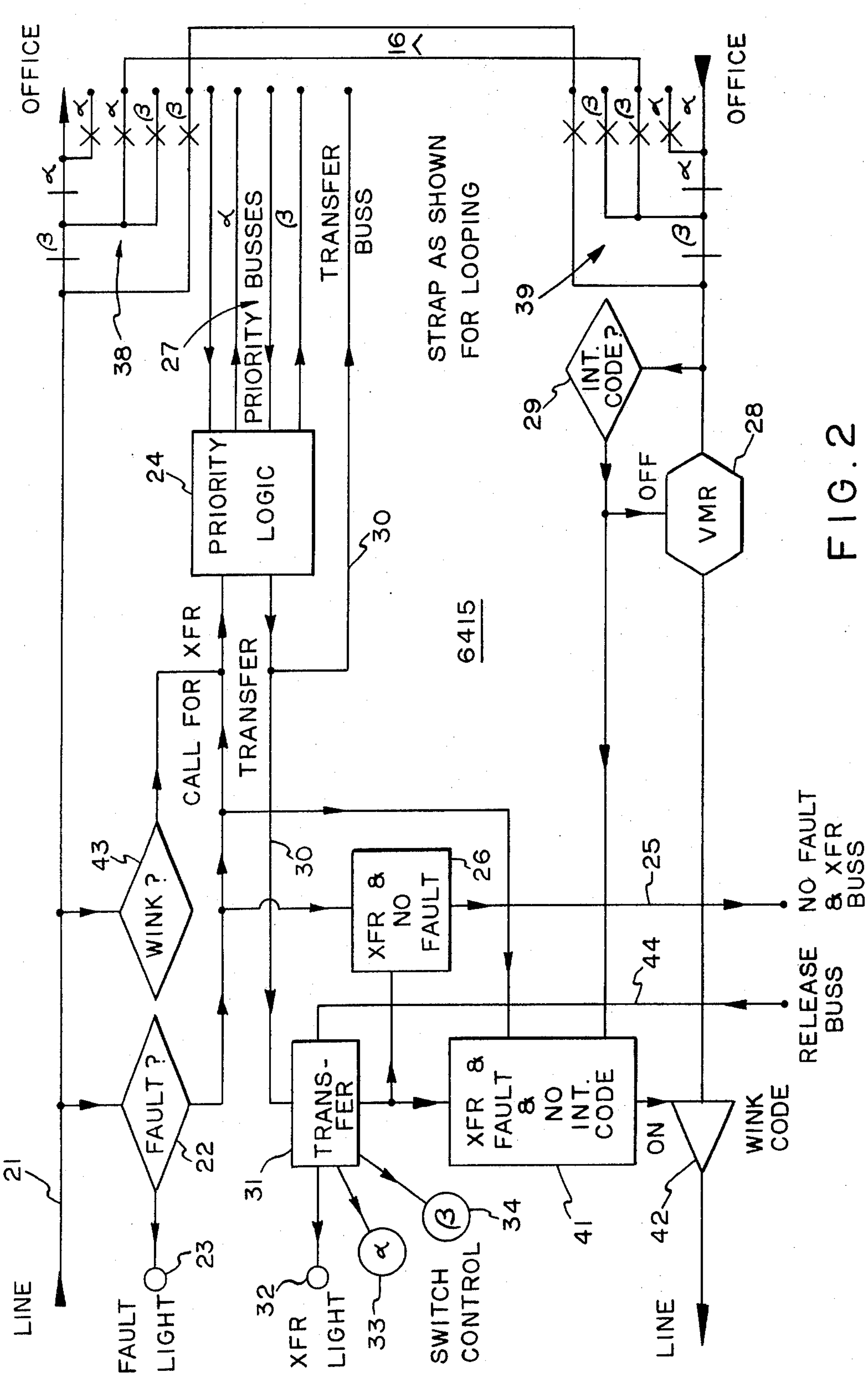
FIG. 2 is a functional block diagram of one of the units used in FIGS. 1A and 1B.

Referring now to the 6415 unit of FIG. 2, such units are used as indicated in FIGS. 1A and 1B at the ends of the spans of the working lines. The ends, of course, are connected in reverse orientation depending on which side of the office they are located on as indicated by the slant of the diagonal of the square. On the incoming pulse code modulation (PCM) line 21 a fault monitor 22 examines the PCM stream for faults. Such faults include bipolar violations in that a normal bipolar system signal must by definition have a positive pulse followed by a negative pulse followed by a positive pulse and so on: that is, alternating. If this does not occur, one of the pulses must be in error so that if two pulses occur with the same polarity this is counted as one bipolar violation or one error. If such is the case, the fault light 23 will be illuminated. The second fault function that is examined for is that the PCM stream must not have more than 14 zeros. This means that in 14 time slots, the 15th time slot must have a pulse in it. If this does not occur, then the fault light 23 will again be illuminated. A third fault function is that of an oscillating line. Here pulses of greater than 1 millisecond are looked for and if such are found, the fault light is illuminated.

The output of fault detector 22 is coupled to both a priority logic unit 24 and a "transfer (XFR) and not fault" unit 26. Priority logic unit 24 is coupled to other 6415 and 6426 units via the priority busses 27 which include both $\alpha$ and $\beta$ lines to correspond to the two protection lines, P$\alpha$ and P$\beta$. This indicates whether a unit of higher priority has in fact taken one of the protection lines; in other words, whether a line of higher priority has been transferred. If this be the case, no transfer can occur. The reason for providing a priority system is that in communications systems there are often lines that will need higher priority protection. For example, lines that should be protected at all times are dedicated facilities which are being paid for by the customer by the minute and are guaranteed by the common carrier (usually a telephone company) to be present. If such service were in a link of this nature, this would be made the highest priority in the carrier group. Thus, if a lower priority trunk was in fault, it should not hold up the transfer of the priority circuits. The priority logic insures that the highest priority line, if it goes into fault, can always pick up the protection line and kick off or eliminate any lower priority line that happens to have previously taken the protection line. It is, of course, apparent that the protection lines have the highest priority of all because when a protection line goes into fault it must "kick off" or reset all other lines. Moreover between the two protection lines, P$\alpha$ has the highest priority.

If the "call for transfer" from fault detector 22 is accepted by priority logic unit 24 a transfer signal is generated on "transfer buss" 30 to actuate transfer unit 31. Line 30 also provides a call for transfer which is communicated to the 6425 or 6426 units in the same side of the office whichever may be the case.

Transfer and no fault unit 26 is used to actuate the reset function if the failure on the line is now no longer present. The output of unit 26 is termed the "no fault transfer buss" 25 which is coupled to the 6425 unit of FIG. 3.

Referring now to the opposite working direction of the unit of FIG. 2, that is from the office to the line, the PCM sent from the office to the line is made correct by the violation monitor and remover (VMR) unit 28. This is included to prevent the errors of a previous failed section of line from being propogated into another section of line thereby falsely indicating that such line has failed. This principle is known in the art. However, in accordance with the present invention in order to allow interrogation of a failed line span upon transfer the VMR unit 28 is disabled whenever interrogation signals are detected by a detector unit 29.

The transfer logic unit 31 illuminates the transfer light 32 to indicate the working line span with which the 6415 is associated has failed. It also drives the switch control units 33 and 34, respectively associated with protection lines P$\alpha$ and P$\beta$, which set up the PCM path through the office. Such units control the switches indicated at 38 and 39 where the slash indicates a closed switch and the $x$ an open switch. The loops 16, also illustrated in FIG. 1B, are only provided on the incoming 6415 units of an office. This is to complete the interrogation path of the protection line.

Transfer logic unit 31 is also coupled to a coincidence logic unit 41 which drives a "wink" error generator 42 to drive errors onto the line going from the office. This is to signal the far end 6415 unit and its associated wink detector 43 that it should transfer as well if it was not the originating end. Thus, this piece of logic insures that any working system on the failed line span is bumped off to the protection line upon a transfer. To emphasize the need for the "wink" circuitry, the transfer of one end of a line is futile unless the other end of the line can be made to transfer also. This requirement for end to end coordination is fulfilled by the "wink" circuitry which causes the PCM bit stream transmitted to the other end to have a very high error rate thereby causing it to go through the same transfer routine.

A logic unit 41 is responsive to the coincidence of three conditions; namely a transfer, fault (from detector 22) and no interrogation code (from code detector 29). The wink code also prevents any oscillation in the side of the line due to no signal being present.

If the failed line should heal or become good, the wink code is discontinued since a fault is no longer being detected. Since the wink code is uniquely detected at the other end of the span by detector 43, fault detector 22 is unaffected by the code. Thus a regenerative wink code loop is prevented.

A release buss 44 is coupled from a 6425 unit to the transfer logic unit 31 to indicate that this 6415 unit should release the protection line. This would occur, for example, upon automatic reset.

Figure 3:
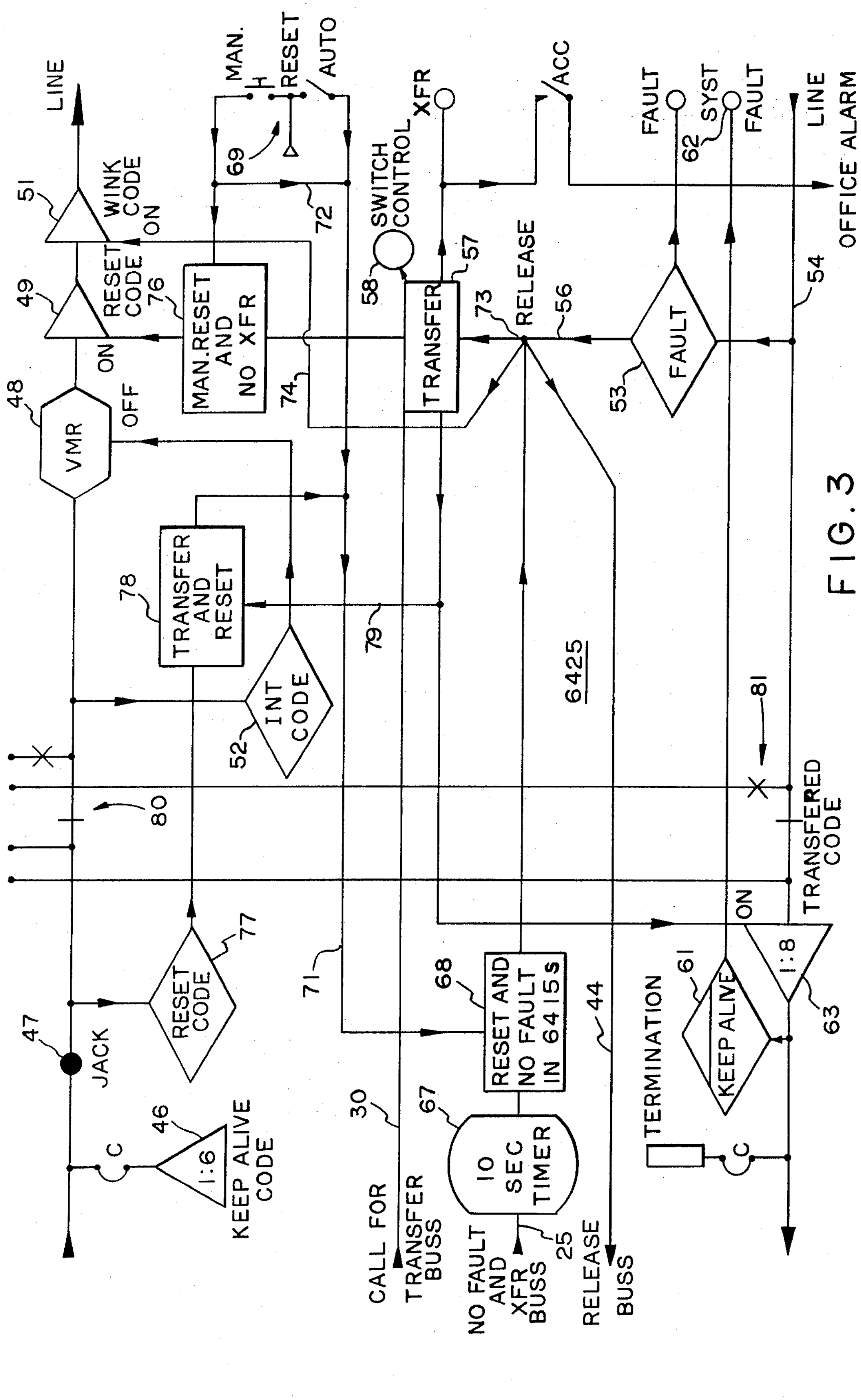
FIG. 3 is a functional block diagram of another of the units used in FIGS. 1A and 1B.

Now referring to the 6425 unit illustrated in FIG. 3, this unit is provided in pairs with a 6426 unit (see FIG. 4) for each protection line link. The 6425 master unit is closest to the command office and the 6426 remote unit is at the other end of each of the protection lines. In addition, the 6425 is used in the "command" location of office one. The requirements of that location differ from those of the other control unit locations in that the unit originates, for example, a one in six code or other unique code is indicated by the keep alive generator 46 and by the strap *c* indicating command only. In the case where the 6425 unit is in the command office, such code is continuously generated and the jack 47 can be used to monitor this code. Going out from the office on the outgoing line there is also a VMR unit 48 to insure that only good PCM is entered onto the protection line. Also included on the outgoing line are a reset code generator 49 and a wink code error generator 51.

In the normal standby condition, the keep alive code from generator 46 and the VMR 48 are on the line and working. However, when the protection line is being used for interrogation the interrogation jack 47 is used in conjunction with a standard span and repeater test set to provide an interrogation code. The VMR 48 is disabled by the interrogation code detector 52.

The 6425 unit of FIG. 3 also includes some of the typical components of the 6415 unit of FIG. 2. This includes a fault detector 53 which in the same manner as the 6415 detects the fault on the incoming line 54 to cause a release signal on line 56. Since the protection line or lines are assumed to be the highest priority, if a fault does occur on the protection line it will "bump off," i.e., reset, any transfers that have occurred. Transfer logic 57 accommodates this function along with its associated switch control unit 58. In addition, the release buss 44 is also coupled to release line 56 which extends to the release busses of all associated 6415 units to cause these units to release the protection line. In other words, the release signal is sent to all the 6415's monitoring the working line in this office.

The one in six keep alive code generated by generator 46 in the top line of the unit of FIG. 3 is detected by the complementary one in six detector 61 in the incoming bottom line. If a one in six code is not present, detector 61 will so detect this "not keep alive" indication to actuate the system fault light 62. This indicates that a system fault has occurred; that is, a transfer has occurred somewhere in the system or the protection line has failed. The failure of the protection line can be distinguished from a transfer by examining the incoming PCM code. On transfer, the 6425 emits one in eight code generated by the one in eight code generator 63 which is actuated by transfer indication of transfer logic unit 57. A termination unit 64 is provided only at the command office as indicated by the command link *c*.

The 6425 units also contain logic that examines the failed lines after transfer has occurred to determine if it is now good. This information is linked to the 6425 unit by the no fault and transfer buss 25 from the associated 6415 unit which is coupled to a 10-second timer 67. If the line is now good for 10 seconds, the failed working line is considered good and a reset or release is initiated by reset and no fault unit 68 after being enabled by an input on line 71. If the reset switch 69 is in the automatic position the reset automatically occurs since switch 69 enables line 71. However, if switch 69 is in manual, line 71 is enabled through link 72 in the particular office when the manual button is pressed. Assuming a no fault indication for 10 seconds a "release" occurs at a node 73 and on line 74 to wink code generator 51. The wink code causes the associated downstream 6426 unit to reset also. Release busses from the 6425 and 6426 units cause the associated 6415 units to release also.

In addition to automatic and local manual reset as described above the present invention provides for remote manual reset from an office remote from the failed span such as the command office. This is accomplished by the "manual reset and no transfer" unit 76 which at the coincidence of a no transfer indication from transfer unit 57 and the activation of the manual reset button turns on reset code generator 49. The reset code is one in two non-error type code. The downstream 6425 unit includes a reset code detector 77 coupled to a "transfer and reset" logic unit 78. If the 6425 unit has its transfer unit 57 activated (to switch or loop around a failed line) logic unit 78 is enabled through line 79 to enable line 71. Resetting of the associated 6415 and 6426 units occurs in the same manner as above.

Upon a failure, the initial transfer request from a 6415 unit is on the "call for transfer buss" 30 which actuates transfer unit 57. The switching actuated by switch control unit 58 are shown at the switching locations 80 and 81 as will be more clearly apparent in conjunction with FIG. 5.

Figure 4:
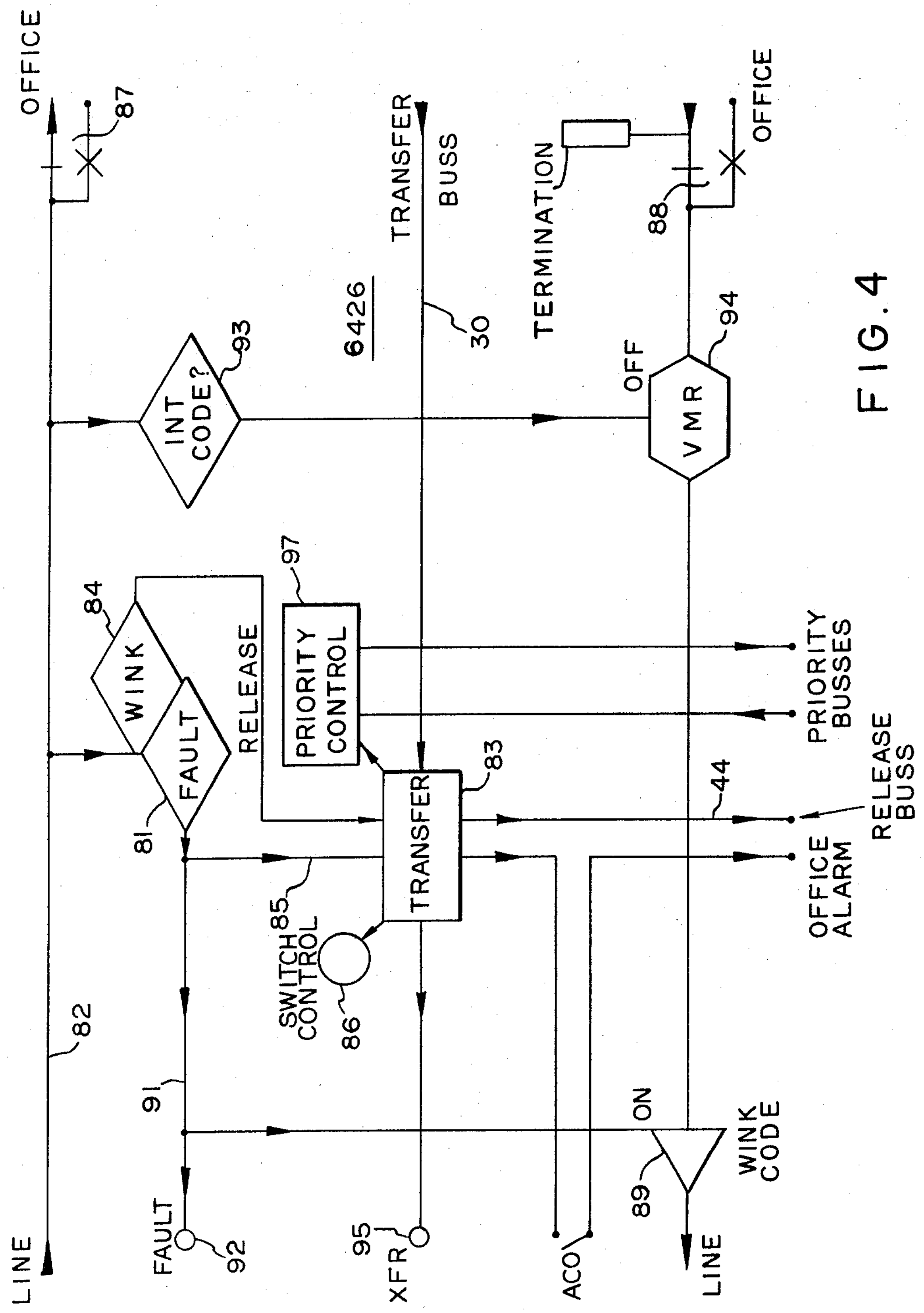
FIG. 4 is yet another functional block diagram of one of the units used in FIGS. 1A and 1B.

Referring now to the 6426 unit on the protection line which is paired up with the 6425 unit which is illustrated in FIG. 4, it includes many of the same components as the 6415 and 6425 units. It is in fact located at the downstream end of the protection line and contains the control logic for such end. It includes the usual fault detector 81 on the incoming line 82 which actuates a transfer unit 83 via release line 85. It therefore has the ability to "bump off" (i.e., reset) any transferred line should it be enabled by means of a release indication to transfer logic unit 83. Wink code detector 84 also provides a release or reset function when a wink code is received from the associated 6425 unit as discussed above. Logic unit 83 controls switch control unit 86 to control the switching at locations 87 and 88 which will be discussed in conjunction with FIG. 5. In order to indicate errors in the reverse direction a wink code error generator 89 is provided which is actuated by a fault indication on the line 91 from fault detector 81. This signals the near end of the protection line that it is in fault and unavailable for transfer. Fault light 92 is illuminated, of course, when a fault is received.

Interrogation is also detected as a separate entity by means of interrogation detector 93 which will turn off VMR unit 94 which is in the reverse direction. This prevents the destroying of the interrogation signal.

If an associated 6415 unit receives a fault on its incoming line, then a request for transfer is placed on the transfer buss 30 from the associated 6415 unit and actuates transfer unit 83. If the protection line is not in fault itself, a transfer will occur. This causes the transfer light 95 to be illuminated and the proper switching is accomplished by switches 87 and 88. If a subsequent fault comes in on the protection line, then a release is immediately made by the line 44 from transfer unit 83. Priority control by unit 97 is accomplished as in the 6415 unit of FIG. 2.

The above explanation has thus far assumed the use of only a single protection line. However the use of two or more protection lines greatly improves the operation of a system especially in the case where several high priority working lines are present.

In accordance with the present invention there must be a strict priority associated with the two protection lines Pα and pβ. Otherwise it may be difficult to judge the true failure condition of the system.

Specifically line Pα has the highest priority meaning that the first transfer will always be to this line. However, the second transfer depends on the original relative priorities of the two failed working lines. That is, upon a second transfer, the faulty working line with the highest priority will always occupy Pα. If the working line which occupies Pα becomes good and is reset, the lower priority line on Pβ will move to occupy Pα.

One major consequence of this philosophy is that an operator can determine in the office the location of each line or double transfer. And at the command office the system fault light on line Pβ will only illuminate if at least two lines are at fault in a common span somewhere in the system. Of course, at this point a further failure in that span would put service in jeopardy. Thus the system fault light on Pα may be connected to a minor office alarm and on Pβ connected to a major alarm.

Figure 5:
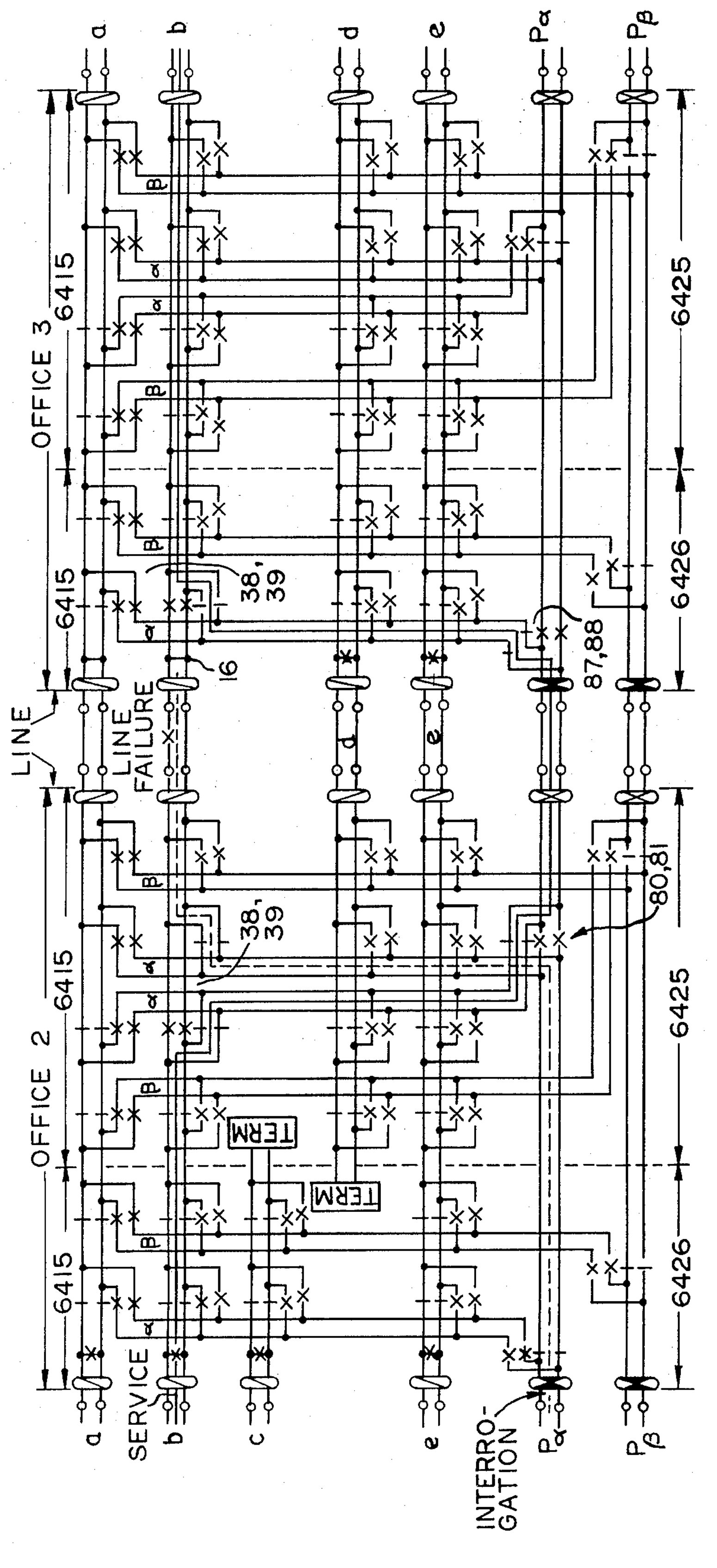
FIG. 5 is a more detailed version of FIG. 1B showing the switching relationship between the functional block diagram of FIGS. 2, 3 and 4.

Referring now to FIG. 5, in conjunction with FIG. 1B, the 6415, 6425 and 6426 units are indicated. A failure has just occurred on the outbound *b* line between offices two and three. This failure would be detected by the fault detector in the 6415 unit at office three and a transfer initiated if the protection line is available. The decision to transfer is communicated from office three to the 6415 unit at office two by a wink code and serves to initiate a corresponding transfer in the 6415 unit at office two by a wink code and serves to initiate a corresponding transfer in the 6415 outgoing unit. The 6415 outgoing unit in office two will then also initiate transfer wink code. The occurrence of all these transfers at both ends of the line will result in an inhibit being sent to all 6415 units lower in the priority scheme. In addition, of course, such transfer indications will be communicated to the appropriate corresponding 6425 and 6426 units in both offices two and three. Specifically, the following simultaneous switching will occur. In office three, loop 16 will be closed and the switches 38 and 39 of the 6415 incoming unit switched to accommodate the looping up of the main communication path from the protection line Pα. These switches should be compared with the line *a* switches. In office two in the 6415 outgoing unit, the 38, 39 switches will switch to both accommodate the communication line being switched down to the protection line and also the interrogation path of the protection line being switched up from the 6425 unit to the failed line. No changes occur in the incoming 6415 unit in office two. With respect to the protection line switching in office three, the 6426 unit accomplishes the looping by its 87, 88 switches. In office two, no switching occurs in the 6426 unit but in the 6425 switching occurs in the 80, 81 switches. The switching thus accomplished is shown by the solid line for the transfer of service path and the dashed line for the interrogation path. A reset of the switches will occur in a reverse manner if the failure is removed from the line segment. Moreover, a reset can be accomplished remotely and automatically with moving to the failed link because of the cross connection of the protection line with the failed link to pretest it before being reset. Thus, a reset is guaranteed to be effective as opposed to the prior art where reset sometimes occurred to a failed line and then caused a retransfer back to the protection line.

If the failed link does not become good, then it is necessary to go to the particular regenerator housing and pull and exchange the unit. The defective regenerator is located by using the interrogation test set. To determine which is the exact regenerator at fault at the location, there are two methods. In one the interrogation signal is connected to the protection line which cross-connects to the failed line. Maintenance personnel then use a standard error detector to probe the lines the detector sensing the line with the interrogation signal on it. Another method is observation of the transfer lights on the appropriate 6415 units in the offices at the ends of the failed span.

It is possible if the system is to be somewhat more sophisticated that a unique code generator could be added to the transfer equipment on the protection line in office two and code which line in the office has failed. A code detector in the command office would then be placed on the protection line to interpret that coded information.

Figure 6:
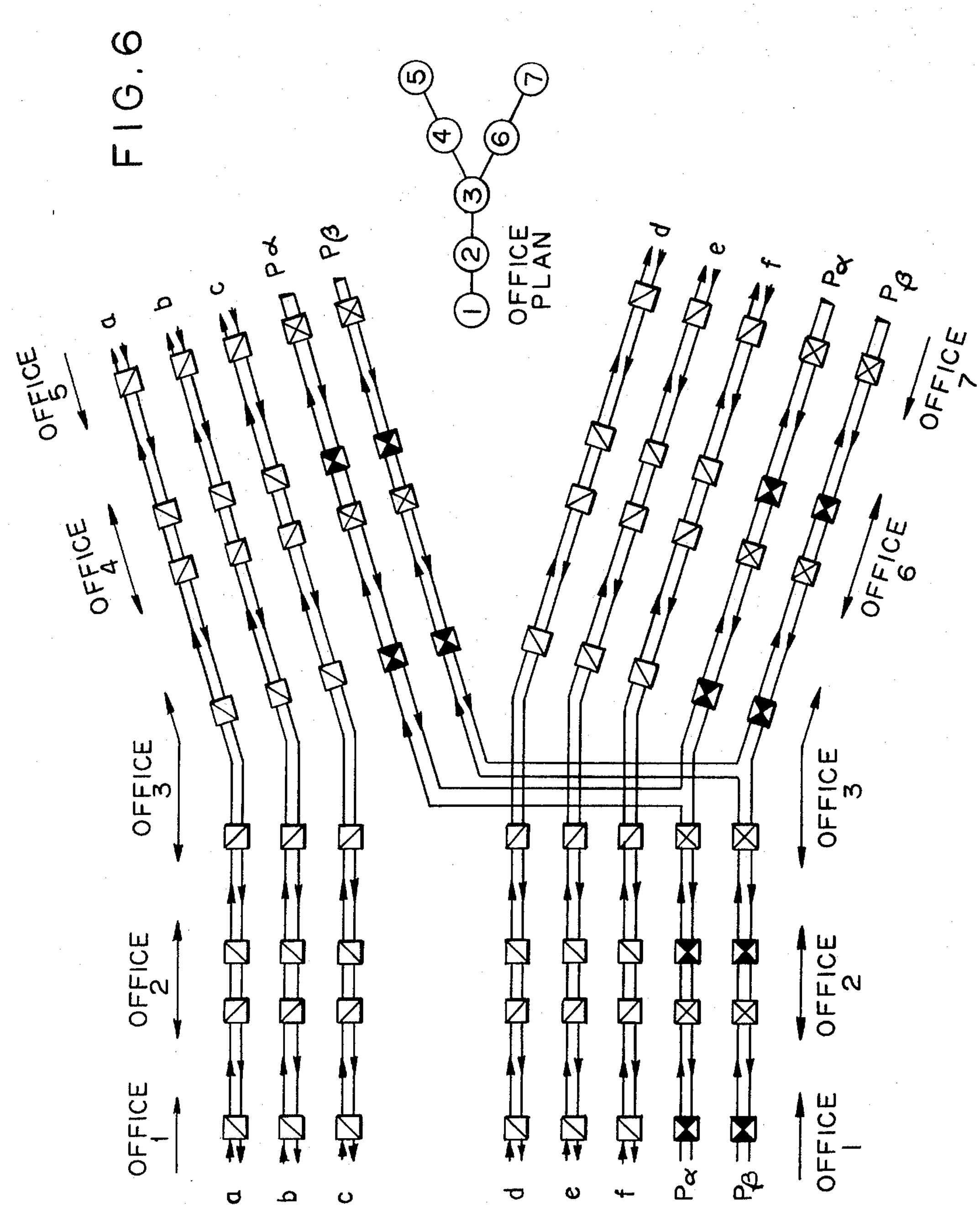
FIG. 6 illustrates a divergent office embodying the present invention.

One of the consequences of the present invention is that one is also able to protect a divergent set of lines. For example, in the prior art, if one has a diverting set of lines in a Y-configuration with a stem and two legs, then the protection line that was run on one leg of the line would have to run along the stem of the Y. Thus, two protection lines in the stem would be necessary for a single Y. However, in the present invention, as illustrated in FIG. 6, only one protection line is required in the stem, i.e., the same protection line in the stem can be used by both legs. This is accomplished by simply taking, for example, the protection line, Pα, up one leg of the Y (offices four and five), looping it back to the divergent office three, and up the other leg (offices six and seven) of the Y looping it back to the divergent office and then back to the main office one. Thus, only a single protection line is required in the stem or the tree of the Y. Thus, if a failure occurs anywhere in the system, it can be reported to the main control office and be interrogated from the command office and also reset if it becomes good.

I claim:

1. In a communications system having a plurality of working lines each of said working lines including a plurality of spans having ends beginning and terminating at offices remote from a command office, an automatic line transfer system for automatically switching the ends of a working line corresponding to both ends of a failed span of one of said plurality of working lines to a protection line without service interruption said transfer system comprising: means for sensing a failed span of a working line; means responsive to said sensing means for switching said ends of said working line corresponding to both ends of said failed span to a corresponding span of said protection line whereby said failed span is looped around; and means for cross-connection said failed span to the preceding span of said protection line to connect said failed span to said command office.

2. A system as in claim 1 together with means for looping said failed line at an end remote from said command office.

3. A system as in claim 1 together with system fault indicating means coupled to protection line in said command office for indicating said line failure.

4. A system as in claim 1 together with violation monitor and remover (VMR) means connected in both said working lines and protection line for preventing propogation of errors from span to span and means responsive to an interrogation code for disabling the VMR means associated with said failed line.

5. A system as in claim 1 including code generator means connected to said protection line for generating a keep alive code and means connected to said protection line for detecting the absence of said keep alive code to thereby indicate a system fault.

6. A system as in claim 1 where said working lines are in pairs with each line of a pair serving as a communication path in one direction together with means responsive to said sensing means sensing failure on one direction of a line pair for generating an error code in the other direction of said line pair.

7. A system as in claim 1 together with means responsive to said sensing means indicating a failure is no longer present on a working line for automatically resetting said switching means to eliminate said protection line loop around said working line.

8. A system as in claim 7 where said resetting means includes timing means for timing said no failure indication a predetermined time before resetting.

9. A system as in claim 1 together with, means responsive to said sensing means indicating a failure is no longer present on a working line for resetting said line, manually actuated reset code generating means coupled to said protection line in said command office, means in each of said remote offices for sensing said reset code and responsive to said reset code for enabling said resetting means.

10. A system as in claim 1 together with an additional protection line and priority control means associated with each of said protection lines for assigning a predetermined one of said protection lines a first priority for transfer of a failed line.

11. A system as in claim 1 where said offices include a divergent office having a stem and legs and where a single protection line in said stem is looped around said legs.

12. In a communications system having a plurality of working lines each of said working lines including a plurality of spans having ends beginning and terminating at offices remote from a command office, an automatic line transfer system for automatically switching the ends of a working line corresponding to both ends of a failed span of one of said plurality of working lines to a protection line without service interruption, said transfer system comprising: means for sensing a failed span of a working line; means included in said protection line at said command office for indicating a system fault; means responsive to said sensing means for switching said ends of said working line corresponding to both ends of said failed span to a corresponding span of said protection line whereby said failed span is looped around; and means for connecting said failed span to said system fault indicating means of said protection line at said command office.

13. A method for use in a communications system having a plurality of working lines each of said working lines including a plurality of spans having ends beginning and terminating at offices remote from a command office for automatically switching the ends of a working line corresponding to both ends of a failed span of one of said plurality of working lines to a protection line, said method including the following steps: sensing a failed span of a working line; switching said ends of said working line corresponding to both ends of said failed span to a corresponding span of said protection line; and cross connecting said failed span to the preceding span of said protection line to connect said failed span to said command office.

14. A method as in claim 13 including the step of interrogating said failed line from said command office via said protection line to determine the location of said failed line.

* * * * *